May 19, 1925.

J. A. MANN 1,538,715

DIRECTION INDICATOR

Original Filed Sept. 17, 1921

Inventor
J. A. Mann,

By

Patented May 19, 1925.

1,538,715

UNITED STATES PATENT OFFICE.

JOHN A. MANN, OF LOCKPORT, NEW YORK.

DIRECTION INDICATOR.

Application filed September 17, 1921, Serial No. 501,321. Renewed November 25, 1924.

*To all whom it may concern:*

Be it known that JOHN A. MANN, a citizen of the United States of America, residing at Lockport, in the county of Niagara and State of New York, has invented new and useful Improvements in Direction Indicators, of which the following is a specification.

The object of the invention is to provide a simple and efficient construction of means whereby the driver of an automobile or similar vehicle may indicate to the drivers of following cars or vehicles his intention in regard to divergence either to the right or left from the path which he has been following or to check or discontinue the forward movement of his car, as a warning to avoid rear end or side collisions; and more particularly to provide a device for the purpose indicated which may be applied to a car without involving the necessity of any change in the latter or rearrangement or reorganization of the parts thereof and wherein the operating elements are within convenient reach of the driver whose hands are ordinarily disposed on or near the steering wheel; and with these objects in view the invention consists in a construction and combination of parts of which a preferred embodiment is shown in the accompanying drawings, wherein:

Figure 1:
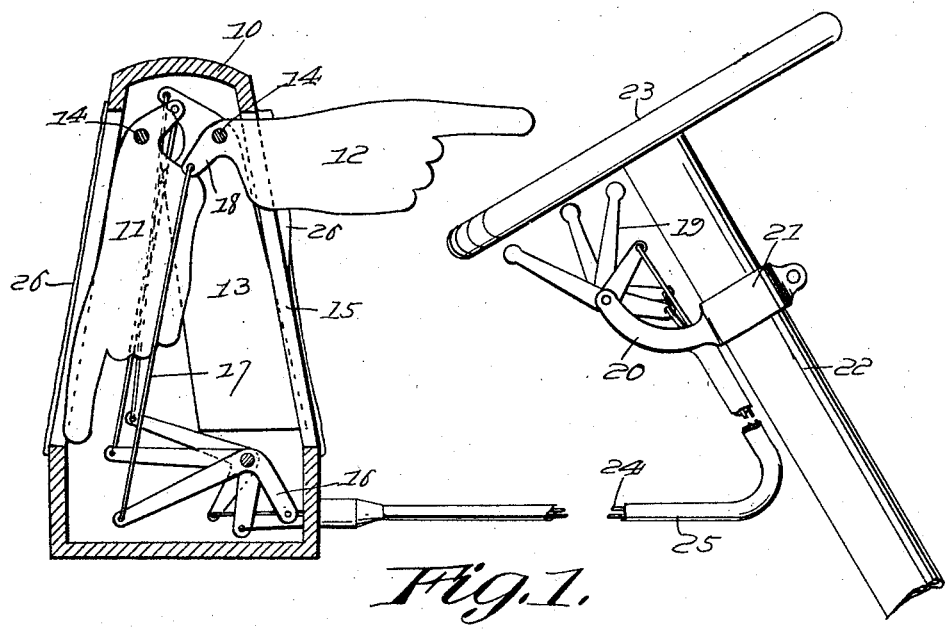
Figure 1 is a side view partly in section of a direction indicating apparatus embodying the invention.
Figure 2:
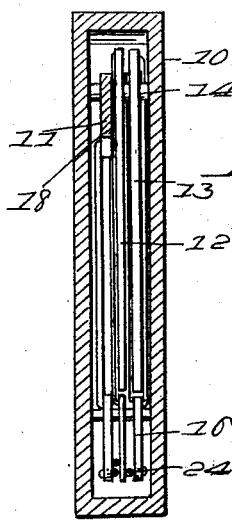
Figure 2 is a sectional view of the signal arm casing in a plane at right angles to that of Figure 1.

The apparatus consists of a signal arm casing 10 adapted for attachment in any suitable or convenient manner to the rear end of a car or vehicle within plain view of the driver of a following car and containing in normally housed condition a plurality of signalling arms or members 11, 12 and 13 or any equivalents thereof, pivotally mounted as at 14 and adapted respectively for extension beyond the casing through suitable slots 15 formed in the walls thereof. In the construction illustrated three of these signalling arms are shown, those designated as 11 and 12 being in the form of hands or pointers and being adapted for extension respectively at opposite sides of the casing to indicate an intention of the driver to turn either to the left or to the right, while the element 13 may be distinguishably designated either by color or otherwise to indicate an intention of the driver to stop or to reduce the forward speed of his machine.

Within the casing and therefore housed and protected thereby are the means consisting of bell-crank levers 16 for selectively actuating the indicating members, each of said levers having one of its arms connected by a rod 17 with an arm 18 of one of the indicating members and having its other arm connected with one of a corresponding series of actuating levers 19 mounted upon a bracket 20 which in the construction illustrated is provided with a clamp 21 for engagement with the steering post 22 so as to locate the operative arms of the levers 19 within convenient reach of the fingers of the hands grasping the steering wheel 23.

Obviously the bracket carrying the operating levers may be attached to any ordinary steering wheel post under such conditions as may best be suited to the particular car on which the indicator is to be used, and as obviously the casing constituting the housing for the indicating members and the means for communicating motion thereto may be attached to the rear end of the car by any suitable means without material modification in the construction of either, and the means for communicating motion from the operating or actuating levers to the bell-crank levers in the casing preferably consist of flexible wires 24 extending through a flexible tubing 25 constituting a guide for the same and adapted to be made of any length and extended under any conditions adapting them to pass from the steering post to the casing without necessitating any preparation of or modification in the construction of the car.

It will be noted that in Figure 1 the indicating members and casing in which the same are mounted is represented as in rear view with the casing in section to expose the indicating members and means for communicating motion thereto while the actuating levers which are located near the steering wheel are represented in side view, but it will be understood as above indicated that the flexibility of the means of connection between the casing and the actuating levers provides for any desired relative positioning of the parts to adapt them to perform their proper functions under the prescribed conditions.

As a means of excluding dust and moisture and fully protecting the operating elements in the casing, the slots 15 in the latter are provided preferably with flexible guard flanges 26 of rubber or webbing adapted to be spread or separated by the movements of the indicating members and to close together after said members have been withdrawn into the casing.

Having described the invention, what is claimed as new and useful is:—

A direction indicator having a casing adapted for support at the rear end of a car or vehicle, indicator members pivotally mounted within and housed by said casing for selective extension through slots in the walls thereof, bell-crank levers also mounted in the casing and respectively connected with said indicator members, and actuating levers arranged adjacent to the vehicle steering wheel and flexibly connected respectively with said bell-crank levers, the slots in the casing for the passage of said indicator members being provided with flexible guard flanges adapted for separation by the extension of said members.

In testimony whereof he affixes his signature.

JOHN A. MANN.